(12) United States Patent
Lin et al.

(10) Patent No.: US 11,556,196 B2
(45) Date of Patent: Jan. 17, 2023

(54) DISPLAY DEVICE

(71) Applicant: Unimicron Technology Corp., Taoyuan (TW)

(72) Inventors: Shih-Yao Lin, Hsin-chu County (TW); Ming-Chang Chan, Hsin-Chu County (TW); Leng-Chieh Lin, Hsin-Chu County (TW); Po-Ching Chan, Hsin-Chu County (TW); Meng-Chia Chan, Hsin-Chu County (TW); Kuo-Feng Cheng, Hsin-Chu County (TW)

(73) Assignee: Unimicron Technology Corp., Taoyuan (TW)

( * ) Notice: Subject to any disclaimer, the term of this patent is extended or adjusted under 35 U.S.C. 154(b) by 0 days.

(21) Appl. No.: 17/317,870

(22) Filed: May 11, 2021

(65) Prior Publication Data

US 2022/0171482 A1  Jun. 2, 2022

Related U.S. Application Data

(60) Provisional application No. 63/119,656, filed on Dec. 1, 2020.

(30) Foreign Application Priority Data

Mar. 23, 2021 (TW) ................... 110110294

(51) Int. Cl.
*G06F 3/041* (2006.01)
(52) U.S. Cl.
CPC ................... *G06F 3/0412* (2013.01)

(58) Field of Classification Search
CPC ...................................... G06F 3/0412
See application file for complete search history.

(56) References Cited

U.S. PATENT DOCUMENTS

| | | | |
|---|---|---|---|
| 10,095,333 B2 * | 10/2018 | Wang | G06F 3/0412 |
| 2007/0201122 A1 * | 8/2007 | Dozeman | B60R 1/088 359/265 |
| 2013/0234966 A1 * | 9/2013 | Jhuang | G06F 3/0412 345/173 |
| 2017/0160846 A1 * | 6/2017 | Wang | G02F 1/157 |
| 2017/0308193 A1 * | 10/2017 | Wu | G06F 3/0412 |

FOREIGN PATENT DOCUMENTS

| | | |
|---|---|---|
| CN | 104932750 | 9/2015 |
| CN | 211507072 | 9/2020 |
| CN | 111736725 | 10/2020 |
| TW | 200508665 | 3/2005 |

OTHER PUBLICATIONS

Office Action of Taiwan Counterpart Application, with English translation thereof, dated Jan. 24, 2022, pp. 1-6.
Office Action of Taiwan Counterpart Application, dated Nov. 10, 2021, pp. 1-5.

\* cited by examiner

*Primary Examiner* — Peter D McLoone
(74) *Attorney, Agent, or Firm* — JCIPRNET

(57) ABSTRACT

A display device includes a display and a transflective module. The transflective module is disposed at one side of the display and includes a glass substrate and a transflective structure layer. The transflective structure layer is disposed on the glass substrate and located between the glass substrate and the display.

8 Claims, 4 Drawing Sheets

DISPLAY DEVICE

CROSS-REFERENCE TO RELATED APPLICATION

This application claims the priority benefits of U.S. provisional application Ser. No. 63/119,656, filed on Dec. 1, 2020, and Taiwan application serial no. 110110294, filed on Mar. 23, 2021. The entirety of each of the above-mentioned patent applications is hereby incorporated by reference herein.

BACKGROUND

Technical Field

The disclosure relates to a display device, and more particularly to a display device capable of reducing double images.

Description of Related Art

In existing products with transflective touch display devices, an opaque conductive material layer (such as a chromium layer) is placed in front of the protective glass (that is, between the user and the protective glass). Such configuration not only affects the touch function, but also produces double images and affects the display quality. In addition, in order to protect the opaque conductive material layer, a protective layer is required for coverage, which not only increases production costs, and dirt will often adheres to the protective layer and it is difficult to clean the protective layer.

SUMMARY

The disclosure provides a display device, which can reduce or avoid occurrence of double images and has a better display quality.

The display device of the disclosure includes a display and a transflective module. The transflective module is arranged on one side of the display and includes a glass substrate and a transflective structure layer. The transflective structure layer is disposed on the glass substrate and located between the glass substrate and the display.

In an embodiment of the disclosure, the transflective module further includes a frame. The frame is arranged between the display and the transflective structure layer. The frame, the display, and the transflective structural layer define a space.

In an embodiment of the disclosure, the display includes a display body and a touch circuit.

In an embodiment of the disclosure, the touch circuit is embedded in the display body or externally connected to one side of the display body.

In an embodiment of the disclosure, the transflective module further includes a frame and a touch sensing layer. The touch sensing layer is configured on the transflective structure layer. The frame is arranged between the display and the touch sensing layer. The frame, the display, and the touch sensing layer define a space.

In an embodiment of the disclosure, the transflective module further includes a frame, a touch module, and an optical adhesive layer. The optical adhesive layer is configured on the transflective structure layer. The touch module is fixed on the transflective structure layer through the optical adhesive layer. The frame is arranged between the display and the touch module. The frame, the display, and the touch module define a space.

In an embodiment of the disclosure, the touch module includes a single indium tin oxide electrode structure layer or a double indium tin oxide electrode structure layer.

In an embodiment of the disclosure, the transflective structure layer includes a transflective mirror.

In an embodiment of the disclosure, the orthographic projection of the display on the glass substrate is less than or equal to the orthographic projection of the transflective structure layer on the glass substrate.

In an embodiment of the disclosure, the display device further includes an optical adhesive layer disposed on the display and the transflective module. The display and the transflective module are joined together through the optical adhesive layer.

Based on the above, in the design of the display device of the disclosure, the transflective structure layer of the transflective module is located between the glass substrate and the display, that is, located inside one side of the glass substrate relatively far away from the user (i.e. behind). Therefore, compared with the existing method through which the opaque conductive material layer is arranged in front of the protective glass, the light reflected from the display of the disclosure is reflected again by the transflective structure layer, and the distance between the light reflected through the transflective structure layer and the light directly reflected from the display is shorter, thus making it possible to effectively reduce or avoid occurrence of double images. In this way, the display device of the disclosure can have a better display quality.

In order to make the features and advantages of the present disclosure more obvious and comprehensible, the following specific examples are given in conjunction with the accompanying drawings to describe in detail as follows.

DESCRIPTION OF THE EMBODIMENTS

Figure 1:
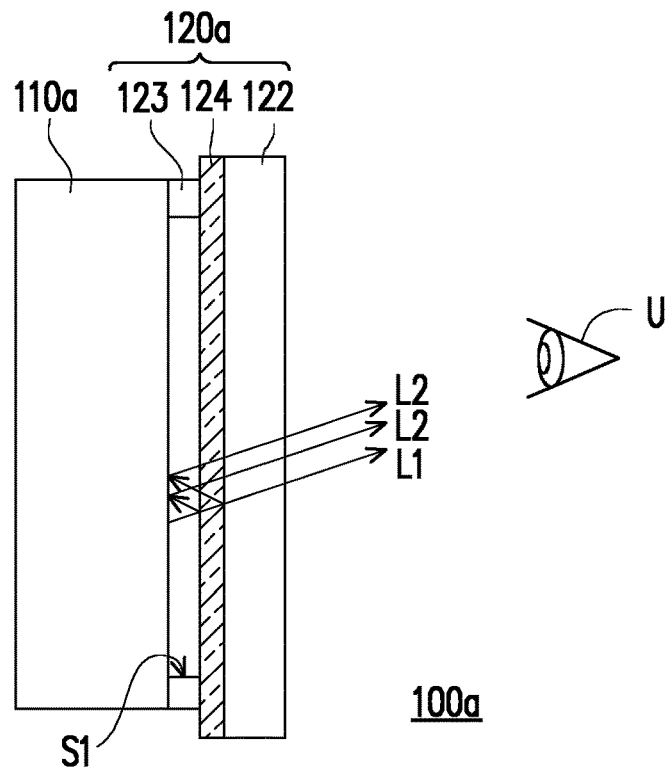
FIG. 1 is a schematic cross-sectional view of a display device according to an embodiment of the disclosure.

FIG. 1 is a schematic cross-sectional view of a display device according to an embodiment of the disclosure. Please refer to FIG. 1. In this embodiment, the display device 100a includes a display 110a and a transflective module 120a. The transflective module 120a is disposed on one side of the display 110a, and includes a glass substrate 122 and a transflective structure layer 124. The transflective structure layer 124 is disposed on the glass substrate 122 and located between the glass substrate 122 and the display 110a.

In detail, in this embodiment, the display 110a is, for example, a thin film transistor-liquid crystal (TFT-LCD) display, an organic light-emitting (OLED) display, a micro light-emitting diode (Micro LED) display, or a sub-millimeter light-emitting diode (Mini LED) display, the disclosure provides no limitation thereto. The orthographic projection of the display 110a on the glass substrate 122 is smaller than or equal to the orthographic projection of the transflective structure layer 124 on the glass substrate 122. In an embodiment, the transflective structure layer 124 may be, for example, a transflective mirror. In another embodiment, the transflective structure layer 124 may be a transparent non-conductive material, a transflective layer composed of a high-refractive material and a low-refractive material overlapped by sputtering, wherein the transmittance of the transflective layer is 30%, and the reflective index is 70%; or, the transmittance is 40% and the reflective index is 60%; or, the transmittance is 50% and the reflective index is 50%. Here, the non-conductive material is, for example, aluminum, chromium, tin, nickel, silicon, or other suitable materials, and the high-refractive material is, for example, silicon dioxide, magnesium fluoride ($MgF_2$), sodium fluoroaluminate ($Na_3AlF_6$) or other suitable materials. The low-refractive material is, for example, titanium dioxide ($TiO_2$), niobium pentoxide ($Nb_2O_5$), tantalum pentoxide ($Ta_2O_5$), zinc oxide (ZNO), silicon nitride ($Si_3N_4$) or other suitable materials.

In addition, the transflective module 120a of this embodiment further includes a frame 123. The frame 123 is disposed between the display 110a and the transflective structure layer 124 to fix the display 110a and the transflective module 120a. The frame 123, the display 110a, and the transflective structure layer 124 define a space S1, and there is air in the space S1. Here, the material of frame 123 includes epoxy resin or an optical adhesive, but not limited thereto.

In this embodiment, the transflective structure layer 124 of the transflective module 120a is arranged at the inner side of the glass substrate 122, which means that the transflective structure layer 124 is relatively far away from the user U but relatively close to the display 110a. Compared with the existing method through which the opaque conductive material layer (such as a chromium layer) is arranged in front of the protective glass (that is, between the user and the protective glass), in the embodiment, the distance between the transflective structure layer 124 and the display 110a is shorter. When the user U looks in the direction of the display 110a from the transflective module 120a, the light L1 reflected from the display 110a is reflected again through the transflective structure layer 124, and the distance between the light L2 that is reflected again and the light L1 directly reflected from the display 110a is shorter, thus making it possible to effectively reduce or avoid occurrence of double images. In this way, the display device 100a of this embodiment can have a better display quality. In addition, the material of the transflective structure layer 124 in this disclosure can be a non-conductive material, and is arranged at the inner side of the glass substrate 122, thus having a better weather resistance.

It should be noted here that the following embodiments adopt the reference numbers and part of the content of the foregoing embodiments, wherein the same reference numbers are used to represent the same or similar elements, and the description of the same technical content is omitted. For the description of the omitted parts, reference may be made to the foregoing embodiments, and no further description will be incorporated herein.

Figure 2:
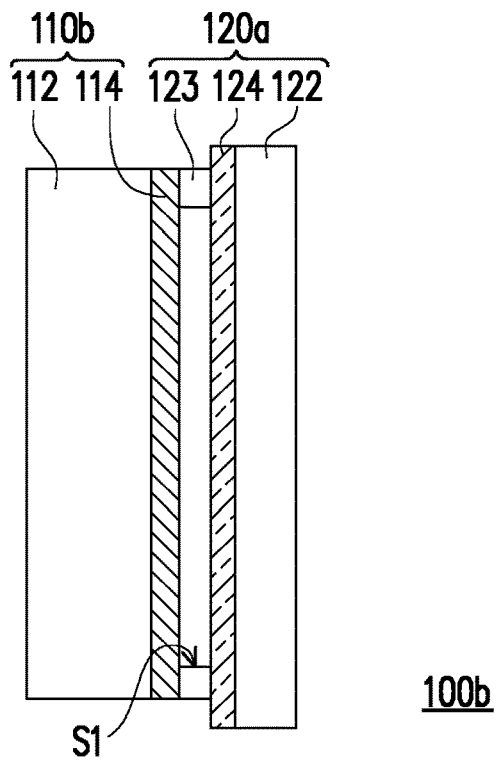
FIG. 2 is a schematic cross-sectional view of a display device according to another embodiment of the disclosure.

FIG. 2 is a schematic cross-sectional view of a display device according to another embodiment of the disclosure. Please refer to FIG. 1 and FIG. 2 both. The display device 100b of this embodiment is similar to the display device 100a of FIG. 1. The difference between the two is: in this embodiment, the display 110b further has a touch function. In detail, the display 110b of this embodiment includes a display body 112 and a touch circuit 114. The touch circuit 114 is embedded in the display body 112, which is a touch in cell (TIC). In another embodiment that is not shown, the touch circuit can be externally connected to one side of the display body, which is touch on cell (TOC), and still belongs to the scope of the disclosure.

Figure 3:
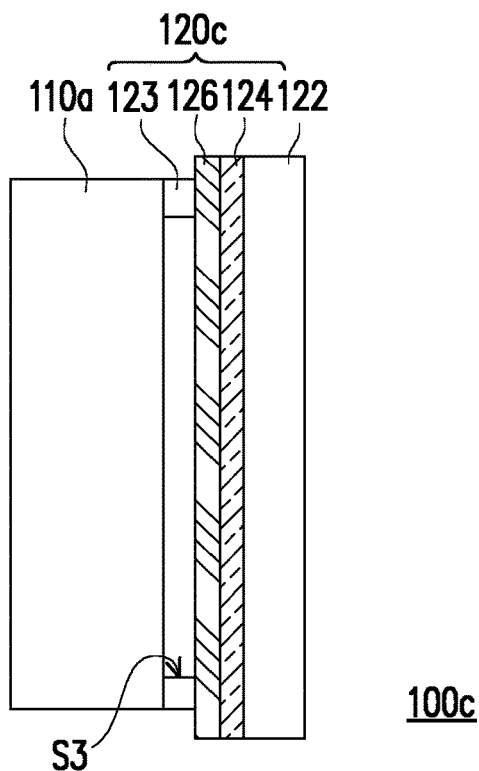
FIG. 3 is a schematic cross-sectional view of a display device according to still another embodiment of the disclosure.

FIG. 3 is a schematic cross-sectional view of a display device according to still another embodiment of the disclosure. Referring to FIG. 1 and FIG. 3 both, the display device 100c of this embodiment is similar to the display device 100a of FIG. 1, the difference between the two is: in this embodiment, the transflective module 120c further includes a touch sensing layer 126. The touch sensing layer 126 is disposed on the transflective structure layer 124, and the transflective structure layer 124 is located between the touch sensing layer 126 and the glass substrate 122. The frame 123 is disposed between the display 110a and the touch sensing layer 126 to fix the display 110a and the transflective module 120c. The frame 123, the display 110a, and the touch sensing layer 126 define a space S3, and there is air in the space S3.

In short, the transflective module 120c of this embodiment further includes a touch sensing layer 126 as a human-machine interface input, wherein the transflective structure layer 124 made of non-conductive material is located between the touch sensing layer 126 and the glass substrate 122, and such configuration does not interfere the touch sensing of the touch sensing layer 126. In addition, the transflective structure layer 124 is disposed at the inner side of the glass substrate 122, which can reduce or avoid the double images generated by the display device 100c, and can also increase the weather resistance of the transflective structure layer 124.

Figure 4A:
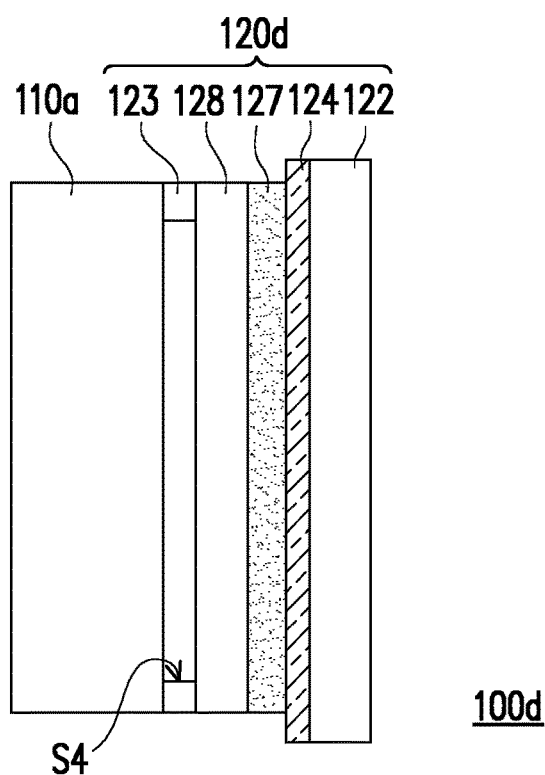
FIG. 4A is a schematic cross-sectional view of a display device according to yet another embodiment of the disclosure.
Figure 4B:
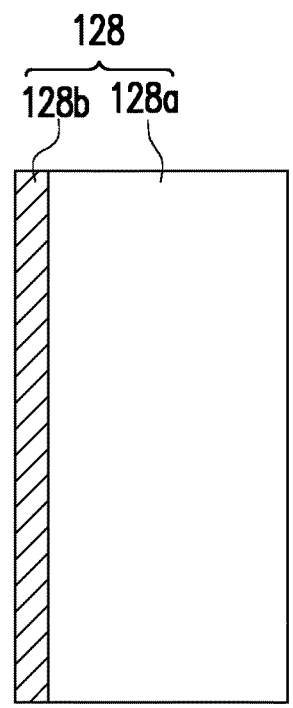
FIG. 4B is a schematic cross-sectional view of the touch module in FIG. 4A.
Figure 4C:
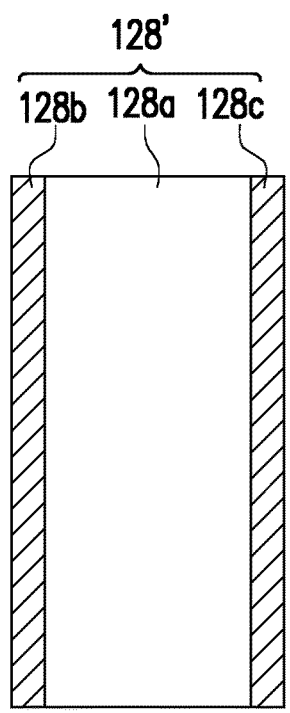
FIG. 4C is a schematic cross-sectional view of another touch module according to an embodiment of the disclosure.

FIG. 4A is a schematic cross-sectional view of a display device according to yet another embodiment of the disclosure. FIG. 4B is a schematic cross-sectional view of the touch module in FIG. 4A. FIG. 4C is a schematic cross-sectional view of another touch module according to an embodiment of the disclosure. Please refer to FIG. 1 and FIG. 4A both first. The display device 100d of this embodiment is similar to the display device 100a of FIG. 1. The difference between the two is: in this embodiment, the transflective module further includes a touch module 128 and an optical adhesive layer 127. The optical adhesive layer 127 is disposed on the transflective structure layer 124, and the transflective structure layer 124 is located between the optical adhesive layer 127 and the glass substrate 122. The touch module 128 is fixed on the transflective structure layer 124 through the optical adhesive layer 127. As shown in FIG. 4B, the touch module 128 of this embodiment is composed of a substrate 128a and an electrode layer 128b disposed at one side of the substrate 128a. The substrate 128a is, for example, a glass substrate or a plastic substrate. The material of the electrode layer 128b is, for example, indium tin oxide. That is, the touch module 128 is a single indium tin oxide (SITO) electrode structure layer. In another embodiment, referring to FIG. 4C, the touch module 128' is composed of the substrate 128a and two electrode layers 128b and 128c disposed on two opposite sides of the substrate 128a, which means that the touch module 128' is a double indium tin oxide (DITO) electrode structure layer.

In another embodiment that is not shown, the touch module can also be arranged into electrode layers through a double metal mesh, which still belongs to the scope of the disclosure. In addition, the frame 123 is disposed between the display 110a and the touch module 128 to fix the display 110a and the transflective module 120d. The frame 123, the display 110a, and the touch module 128 define a space S4, and there is air in the space S4.

Figure 5:
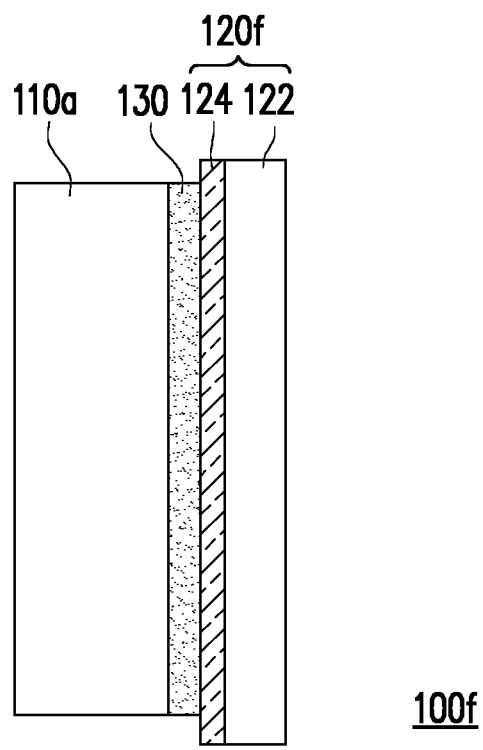
FIG. 5 is a schematic cross-sectional view of a display device according to another embodiment of the disclosure.

FIG. 5 is a schematic cross-sectional view of a display device according to another embodiment of the disclosure. Referring to FIG. 1 and FIG. 5 both, the display device 100f of this embodiment is similar to the display device 100a of FIG. 1, the difference between the two is: the display device 100f of this embodiment further includes an optical adhesive layer 130, which is configured between the display 110a and the transflective module 120f, wherein the display 110a and the transflective module 120f are joined together through the optical adhesive layer 130. Here, the optical adhesive layer 130 is completely attached to the surface of the display 110a and the transflective structure layer 124, which means that there is no air layer between the display 110a and the transflective module 120f in this embodiment.

It should be mentioned that, because the display devices 100a, 100b, 100c, 100d, and 100f of this embodiment are provided with transflective modules 120a, 120c, 120d, and 120f, they also function as mirrors. Therefore, the display devices 100a, 100b, 100c, 100d, and 100f of this embodiment can also be combined with a photosensitive device depending on the difference in ambient light intensity to automatically sense and adjust the brightness of the display devices 100a, 100b, 100c, 100d, and 100f, such that the user U can see his/her own image with the optimal contrast, and the display devices 100a, 100b, 100c, 100d, and 100f can have the optimal contrast.

In summary, in the design of the display device of the disclosure, the transflective structure layer of the transflective module is located between the glass substrate and the display, that is, located inside one side of the glass substrate relatively far away from the user (i.e. behind). Therefore, compared with the existing method through which the opaque conductive material layer is arranged in front of the protective glass, the light reflected from the display of the disclosure is reflected again by the transflective structure layer, and the distance between the light reflected through the transflective structure layer and the light directly reflected from the display is shorter, thus making it possible to effectively reduce or avoid occurrence of double images. In this way, the display device of the disclosure can have a better display quality.

Although the disclosure has been disclosed as above by way of embodiments, it is not intended to limit the disclosure. Any person with ordinary knowledge in the technical field can make some changes and decorations without departing from the spirit and scope of the disclosure, so the protection scope of the disclosure shall be determined by the scope of the attached claims.

What is claimed is:

1. A display device, comprising:
a display; and
a transflective module arranged at one side of the display and comprising a glass substrate, a transflective structure layer and a single indium tin oxide touch sensing layer, wherein the transflective structure layer is directly arranged on the glass substrate and located between the glass substrate and the display, there is air between the display and the transflective module, the touch sensing layer is directly disposed on the transflective structure layer, and the transflective module further comprises a frame, the frame is disposed directly on the touch sensing layer, and the frame, display, and the touch sensing layer define a space comprising the air.

2. The display device according to claim 1, wherein the display comprises a display body and a touch circuit.

3. The display device according to claim 2, wherein the touch circuit is embedded in the display body or externally connected to one side of the display body.

4. The display device according to claim 1, wherein the transflective module further comprises a frame, the frame is disposed between the display and the touch sensing layer, and the frame, the display, and the touch sensing layer define a space.

5. The display device according to claim 1, wherein the transflective module further comprises an optical adhesive layer, the optical adhesive layer is disposed on the transflective structure layer, and the single indium tin oxide touch sensing layer is fixed to the transflective structural layer through the optical adhesive layer.

6. The display device according to claim 1, wherein the transflective structure layer comprises a transflective mirror.

7. The display device according to claim 1, wherein an orthographic projection of the display on the glass substrate is smaller than or equal to an orthographic projection of the transflective structure layer on the glass substrate.

8. The display device according to claim 1, further comprising:
an optical adhesive layer arranged between the display and the transflective module, wherein the display and the transflective module are joined together through the optical adhesive layer.

* * * * *